United States Patent
Gaynier et al.

(10) Patent No.: US 6,759,760 B2
(45) Date of Patent: Jul. 6, 2004

(54) METHOD TO ELIMINATE SHIPPING FUSE HANDLING

(75) Inventors: John M Gaynier, Carleton, MI (US); John Fiaschetti, Rochester Hills, MI (US); Frank Trovato, Holly, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 211 days.

(21) Appl. No.: 10/176,803

(22) Filed: Jun. 21, 2002

(65) Prior Publication Data

US 2003/0234580 A1 Dec. 25, 2003

(51) Int. Cl.$^7$ ............................................... H02H 7/18
(52) U.S. Cl. .................................................... 307/10.7
(58) Field of Search ............................. 307/10.3, 10.6, 307/10.7, 150; 320/136; 361/212

(56) References Cited

U.S. PATENT DOCUMENTS

| | | | | |
|---|---|---|---|---|
| 3,656,045 A | * | 4/1972 | Frezzolini et al. | 320/136 |
| 5,633,540 A | * | 5/1997 | Moan | 307/128 |
| 5,691,619 A | * | 11/1997 | Vingsbo | 361/86 |
| 5,818,122 A | * | 10/1998 | Miyazawa et al. | 307/10.7 |
| 6,347,030 B1 | | 2/2002 | Matsuura | 361/166 |
| 6,369,460 B1 | * | 4/2002 | Endoh et al. | 307/31 |
| 6,437,460 B1 | * | 8/2002 | Theofanopoulos et al. | 307/10.1 |
| 6,445,276 B2 | * | 9/2002 | Schon et al. | 337/184 |
| 6,630,749 B1 | * | 10/2003 | Takagi et al. | 307/10.7 |

\* cited by examiner

*Primary Examiner*—Adolf Berhane
(74) *Attorney, Agent, or Firm*—Edwin W. Bacon, Jr.

(57) ABSTRACT

A vehicle power distribution system for selectively providing battery power to a circuit. A circuit-interrupting device is arranged to respond to a control signal by selectively applying the battery power to the circuit. A circuit protection device is moveable between a first circuit position and a second circuit position, where the first circuit position is arranged to pass a current through the circuit concurrently with the circuit interrupting device. The second circuit position is arranged to pass the current around said circuit interrupting device.

19 Claims, 1 Drawing Sheet

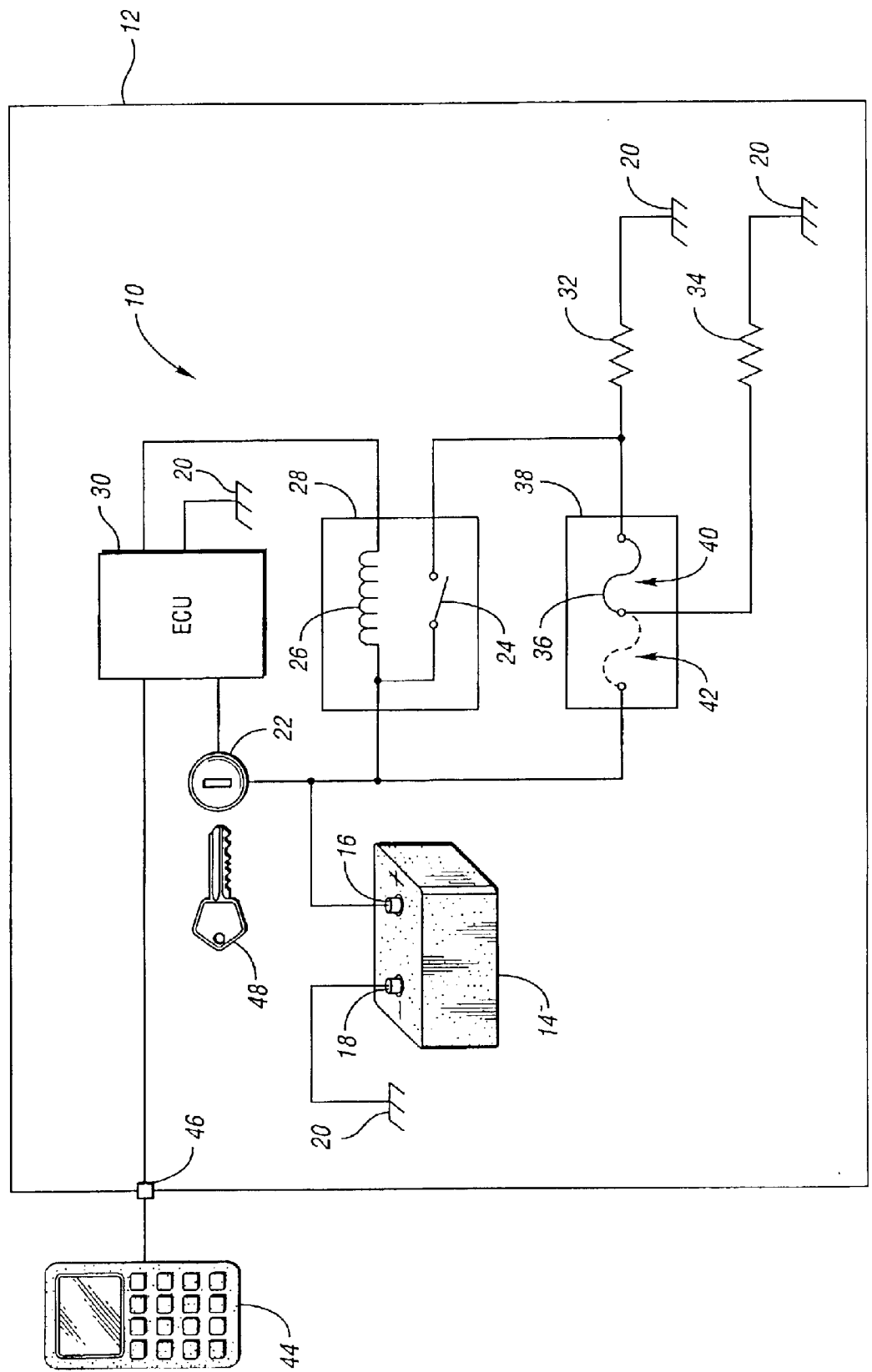

METHOD TO ELIMINATE SHIPPING FUSE HANDLING

FIELD OF INVENTION

This invention relates generally to power distribution systems for vehicles and, more particularly, to power distribution systems that are remotely configurable to selectively provide power to various circuits.

BACKGROUND

Modern vehicles, such as automobiles, employ a number of digital electronic controllers and accessories that require constant power. The power is needed to maintain settings in digital memory while the vehicle is not being used. These settings may relate to preferred positions for power mirrors and seats, diagnostic information relating to the vehicle powertrain, radio preferences, digital clocks, and a number of other applications.

When designing the electrical power distribution system for the vehicle, engineers must identify which electrical devices require constant power and which devices may have power disconnected when the vehicle is not in use. The devices that require constant power are then wired to single circuit commonly called the Ignition-Off Draw (IOD) circuit, which is protected by an IOD fuse. The IOD circuit is powered by the vehicle battery so that power is available regardless of the state of the vehicle ignition switch.

Over time, the devices on the IOD circuit can discharge the vehicle battery so that the battery is unable to provide sufficient power to start the vehicle. For example, this extensive discharge can occur when the vehicle is turned off and in transit from the manufacturing facility to a dealer, as the shipping process may take several weeks. Attempts to reduce the risk of discharge during shipping have typically involved removing the IOD fuse from the fuse box and storing it in the vehicle prior to shipping. The dealer then, as part of preparing the vehicle for sale, retrieves the IOD fuse from the storage location and reinserts it in the fuse box.

One issue with the aforementioned method of preventing battery discharge is that it is preferable to have the IOD fuse installed during manufacture, thereby facilitating comprehensive electrical testing of the vehicle during the assembly. The IOD must then be removed and stored after the electrical testing is complete and prior to shipping the vehicle. This handling of the fuse increases the likelihood of human error during manufacture of the vehicle. One possible error is that the vehicle manufacturer will forget to remove the IOD fuse prior to shipping. Another possible error is that the fuse will be mishandled during removal or storage, thereby causing damage to the fuse box. Yet another possible issue is that the fuse box will become contaminated with debris or water when the fuse box is opened to remove and store the IOD fuse.

BRIEF DESCRIPTION OF THE INVENTION

Accordingly, an aspect of the present invention is to provide a power distribution system capable of eliminating the need to remove an IOD fuse prior to shipping the vehicle.

Another aspect of the invention is to provide a power distribution system capable of remotely and selectively powering an IOD circuit during vehicle testing at the manufacturing plant.

In accordance with these and other desired aspects of this invention, a vehicle power distribution system is provided for selectively providing battery power to a circuit. A circuit-interrupting device is arranged to respond to a control signal by selectively applying the battery power to the circuit. A circuit protection device is moveable between a first circuit position and a second circuit position, where the first circuit position is arranged to pass a current through the circuit concurrently with the circuit interrupting device. The second circuit position is arranged to pass the current around said circuit interrupting device.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The FIGURE depicts a schematic diagram of a power distribution system for a vehicle.

DETAILED DESCRIPTION

The FIGURE depicts a power distribution system 10 for a vehicle 12. A battery 14 has positive 16 and negative 18 terminals for providing electrical power. The negative terminal 18 is connected to ground 20. The positive terminal 16 provides battery power to an ignition switch 22 and a circuit-interrupting device 28. For the purpose of explanation, the circuit-interrupting device 28 is shown as a relay having a contact 24 and a coil 26, however it is appreciated that other circuit-interrupting devices may be used, such as a solid-state relay or transistor. A vehicle electronic control unit (ECU) 30 activates the circuit-interrupting device 28 in response to certain events described later.

Electrical loads that may have power disconnected when the vehicle is turned off are shown combined into a single load 32 connected to ground 20. An example of a load 32 is the ignition system of the vehicle engine. The load 32 is powered when the relay contact 24 is closed in response to the coil 26 being activated by the module 30.

IOD loads of the vehicle are shown combined into a single IOD load 34. The IOD load 34 needs constant battery 14 power during normal vehicle operation and is connected to one side of an IOD fuse 36. The IOD fuse 36, typically located in a fuse box 38, is shown in a manufacturing and shipping position 40 that is used when the vehicle is being assembled, tested, and shipped. Upon arrival at a shipping destination, the IOD fuse 36 is moved to an in-use position 42. With the IOD fuse 36 in the manufacturing and shipping position 40, the IOD load 34 receives battery 14 power when the relay contact 24 is closed. Once the IOD fuse 36 is moved to the in-use position 42, the IOD load 34 receives constant battery 14 power regardless of whether relay contact 24 is open or closed.

To facilitate electrical testing of the vehicle during manufacture, the ECU 30 responds to certain events by activating the circuit-interrupting device 28. In an exemplar embodiment, an event is receipt of a command from a scan tool 44. The scan tool 44 may communicate with the ECU 30 via a communications port 46 such as a radio frequency or hardwire link. In yet another exemplar embodiment, the event responded to by the ECU 30 is the activation of the ignition switch 22. The ignition switch 22 may be actuated with a key 48, or via a remote command.

By responding to such events, the ECU 30 controls power to the IOD load 34 while the IOD fuse 34 remains in the manufacture and shipping position 40. This eliminates the need to remove and store the IOD fuse 38 during the manufacturing process.

In an exemplary arrangement, the IOD fuse 36 can be moved to the in-use position 40 while the vehicle is being prepared for sale by a dealer. To simplify moving the IOD fuse 36 between the shipping 38 and in-use 40 positions, the IOD fuse 36 may be mounted in a holder that can be rotated, translated, or otherwise moved between the two positions without physically removing the IOD fuse 36 from the fuse holder. This may reduce the possibility of damaging the IOD fuse 36 and the fuse box 38 while moving the IOD fuse 36 from one position to the other. An example of such a fuse holder and fuse box assembly is available from DAIMLER-CHRYSLER® as part number 04727987AC.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A vehicle power distribution system for selectively providing battery power to a circuit, said power distribution system comprising:
   a control signal;
   a circuit-interrupting device arranged to respond to said control signal by selectively applying the battery power to the circuit; and
   a circuit protection device moveable between a first circuit position and a second circuit position, wherein said first circuit position is arranged to pass a current through the circuit concurrently with said circuit interrupting device and said second circuit position is arranged to pass said current around said circuit interrupting device.

2. The system of claim 1 wherein said control signal is generated by a control element.

3. The system of claim 2 wherein said control element is an ECU.

4. The system of claim 2 wherein said control element generates said control signal in response to a remote command.

5. The system of claim 4 wherein said remote command is provided by a tool.

6. The system of claim 4 wherein said remote command is a radio frequency signal.

7. The system of claim 4 wherein said remote command is provided by a switch.

8. A vehicle power distribution system for selectively providing battery power to a load, said power distribution system comprising:
   a control signal;
   a circuit-interrupting device arranged to respond to said control signal by selectively opening and closing a circuit between the battery and the load; and
   a circuit protection device moveable between a first circuit position and a second circuit position, wherein said first circuit position is in series with said circuit and said second circuit position is in parallel with said circuit interrupting device.

9. The system of claim 8 wherein said control signal is generated by a control element.

10. The system of claim 9 wherein said control element is an ECU.

11. The system of claim 9 wherein said control element generates said control signal in response to a remote command.

12. The system of claim 11 wherein said remote command is provided by a tool.

13. The system of claim 11 wherein said remote command is a radio frequency signal.

14. The system of claim 11 wherein said remote command is provided by a switch.

15. A method for selectively providing power from a battery to an IOD circuit during assembly of a vehicle, said method comprising:
   providing a distribution circuit having a circuit interruption device and a circuit protection device, said circuit protection device being moveable between a first electrical location connected in series with said circuit interruption device and a second electrical location connected in parallel with said circuit interruption device;
   providing electrical power to said distribution circuit; and
   selectively closing said circuit interruption device while the circuit protection device is in the first electrical location.

16. The method of claim 15 further comprising performing an electrical test on a load connected to the connected circuit, said test being performed at least in part while said circuit interruption device is closed.

17. The method of claim 15 further comprising transmitting a radio frequency signal for selectively closing said circuit interruption device.

18. The method of claim 15 further comprising actuating a switch for selectively closing said circuit interruption device.

19. The method of claim 15 further comprising performing an electrical test on a load connected to the IOD circuit while the circuit interruption device is closed, and moving the circuit protection device to the second electrical location after completion of the electrical test.

* * * * *